US012136400B2

(12) United States Patent
Zhao et al.

(10) Patent No.: US 12,136,400 B2
(45) Date of Patent: Nov. 5, 2024

(54) VIEWING ANGLE COMPENSATION METHOD AND APPARATUS FOR DISPLAY PANEL, AND DISPLAY PANEL

(71) Applicants: Haining ESWIN IC Design Co., Ltd., Zhejiang (CN); Beijing ESWIN Computing Technology Co., Ltd., Beijing (CN)

(72) Inventors: Bo Zhao, Jiaxing (CN); Qiqiang Han, Jiaxing (CN); Chi Zhang, Jiaxing (CN); Huawen Ding, Jiaxing (CN)

(73) Assignees: Haining ESWIN IC Design Co., Ltd., Haining (CN); Beijing ESWIN Computing Technology Co., Ltd., Beijing (CN)

( * ) Notice: Subject to any disclaimer, the term of this patent is extended or adjusted under 35 U.S.C. 154(b) by 49 days.

(21) Appl. No.: 18/146,433

(22) Filed: Dec. 26, 2022

(65) Prior Publication Data

US 2023/0205014 A1 Jun. 29, 2023

(30) Foreign Application Priority Data

Dec. 27, 2021 (CN) ......................... 202111617407.5

(51) Int. Cl.
*G09G 3/36* (2006.01)

(52) U.S. Cl.
CPC ... *G09G 3/3607* (2013.01); *G09G 2300/0447* (2013.01); *G09G 2320/0247* (2013.01);
(Continued)

(58) Field of Classification Search
CPC ... G09G 2300/0447; G09G 2320/0247; G09G 2320/0271; G09G 2320/028;
(Continued)

(56) References Cited

U.S. PATENT DOCUMENTS

2009/0153594 A1* 6/2009 Umeda ................ G09G 3/3648 345/690
2010/0033473 A1* 2/2010 Hsieh .................. H04N 13/349 345/94

(Continued)

*Primary Examiner* — Robin J Mishler

(57) ABSTRACT

The present disclosure discloses a viewing angle compensation method and apparatus for a display panel, and the display panel, and relates to the technical field of liquid crystal displaying. The purpose of increasing a visual angle of an MVA liquid crystal panel can be achieved, and for a whitening phenomenon of a screen watched at a side viewing angle, a better improving effect can be given. A main technical solution of the present disclosure includes: receiving to-be-processed image data, the image data including pixel points formed in a plurality of rows and a plurality of columns, and each pixel point having different subpixels on red, green and blue three-color channels; adjusting current gray-scale values of the subpixels by looking up a preset visual compensation lookup table to obtain adjusted gray-scale values, the preset visual compensation lookup table including two corresponding gamma curves, and the two corresponding gamma curves being used for describing corresponding adjustable ranges of the gray-scale values; and acquiring first target image data as output target image data according to the adjusted gray-scale values corresponding to the subpixels.

15 Claims, 8 Drawing Sheets

(52) U.S. Cl.
CPC ............... *G09G 2320/0271* (2013.01); *G09G 2320/028* (2013.01); *G09G 2320/0285* (2013.01); *G09G 2320/0673* (2013.01)

(58) Field of Classification Search
CPC ... G09G 2320/0285; G09G 2320/0673; G09G 3/3607
See application file for complete search history.

(56) References Cited

U.S. PATENT DOCUMENTS

| | | | | |
|---|---|---|---|---|
| 2019/0340984 | A1* | 11/2019 | Zhao .................... | G09G 3/3648 |
| 2021/0043153 | A1* | 2/2021 | Yang .................... | G09G 3/3607 |
| 2021/0074229 | A1* | 3/2021 | Hsu ...................... | G09G 3/3607 |
| 2022/0036839 | A1* | 2/2022 | Chen .................... | G09G 3/3607 |

* cited by examiner

| | | |
|---|---|---|
| P(x-1,y-1) | P(x,y-1) | P(x+1,y-1) |
| P(x-1,y) | P(x,y) | P(x+1,y) |
| P(x-1,y+1) | P(x,y+1) | P(x+1,y+1) |

Fig. 6

VIEWING ANGLE COMPENSATION METHOD AND APPARATUS FOR DISPLAY PANEL, AND DISPLAY PANEL

CROSS REFERENCE TO RELATED APPLICATION

This application claims priority to Chinese Patent Application No. CN202111617407.5 titled "VIEWING ANGLE COMPENSATION METHOD AND APPARATUS FOR DISPLAY PANEL, AND DISPLAY PANEL" and filed to the State Patent Intellectual Property Office on the entire contents of which are incorporated herein by reference.

TECHNICAL FIELD

The present disclosure relates to the technical field of liquid crystal displaying, in particular to a viewing angle compensation method and apparatus for a display panel, and the display panel.

BACKGROUND ART

Due to its lightness, low power consumption, abundant color display and high picture definition, a liquid crystal display has been widely popularized, and a mainstream large-size liquid crystal display includes a VA (Vertical Alignment) liquid crystal panel or an IPS (In-Plane-Switching) liquid crystal panel, etc. For the VA liquid crystal panel, it shows a poorer display effect at a side viewing angle, and there may be a problem of obvious picture whitening.

For example, FIG. 1 illustrates a tendency of a luminance change curve of a screen watched at a 0-DEG front viewing angle and a 60-DEG side viewing angle and shows a tendency of a curve that luminance changes with the increment of gray scales. In FIG. 1, horizontal coordinates represent gray-scale values (identified as gray, i.e. 256-level gray-scale values, and used for indicating different luminance levels), vertical coordinates represent watched screen luminance (identified as luminance). In FIG. 1, a solid-line curve is used for describing the tendency of the luminance change curve of the screen watched at the 0-DEG front viewing angle, and a dotted line is used for describing the tendency of the luminance change curve of the screen watched at the 60-DEG side viewing angle. As shown in FIG. 1, before the full line and the dotted line reach a first intersection point, with the increment of the gray-scale values, the dotted line is located above the full line, that is, the luminance of the screen watched at the side viewing angle is far higher than the watching effect at the front viewing angle; and over high luminance may cause a phenomenon of picture whitening at a watching angle of a user.

The main reason for this problem is that, after incident light from a backlight source passes through a polarizer and a liquid crystal, i.e. an alignment film, output light has had specific direction characteristics; and when the best display effect is achieved at the front viewing angle, with the increment of the side viewing angle, picture distortion seen in a side direction can also change therewith, and there is great deviation from the front viewing angle.

At present, in order to solve this problem, most of panel manufacturers design a panel with a multi-domain structure, namely an MVA (Multi-domain Vertical Alignment) liquid crystal panel, and there are two mainstream multi-domain structures including a 4-domain structure and an 8-domain structure. However, the liquid crystal panel with the multi-domain structure can improve the picture display effect under the condition that the side viewing angle is not very large, however, with the increment of the side viewing angle, and when it is increased to great extent, the problem of picture whitening may be still exposed, the achieved improvement effect is nonideal, it is difficult to satisfy the demand that a user watches a screen at multiple angles, and thus, user experience is lowered.

SUMMARY OF THE INVENTION

To this end, the present disclosure provides a viewing angle compensation method and apparatus for a display panel, and the display panel, which have the main purpose of adjusting gray-scale values of different subpixels of each pixel point on red, green and blue three-color channels, thereby achieving the purpose of increasing a visual angle of an MVA liquid crystal panel, avoiding the problem of picture whitening on a screen watched at a side viewing angle as much as possible, greatly satisfying the demand of a user watching the screen at multiple angles, and improving the use experience of the user.

In order to achieve the above-mentioned objectives, the present disclosure mainly provides the following technical solutions:

a first aspect of the present application provides a viewing angle compensation method for a display panel, wherein the method includes:

receiving to-be-processed image data, the image data including pixel points formed in a plurality of rows and a plurality of columns, and each pixel point having different subpixels on red, green and blue three-color channels;

adjusting current gray-scale values of the subpixels of the pixel point by looking up a preset visual compensation lookup table to obtain adjusted gray-scale values; and outputting first target image data as visually-compensated image data according to the adjusted gray-scale values corresponding to the subpixels.

In some modified implementations of the first aspect of the present application, the step of adjusting current gray-scale values of the subpixels of the pixel points by looking up a preset visual compensation lookup table to obtain adjusted gray-scale values includes:

performing division in the plurality of pixel points included in the image data in a way of dividing two adjacent pixel points into a group to obtain a plurality of groups of pixel points, each group of pixel points including a first pixel point and a second pixel point;

dividing the red, green and blue three-color channels into two groups to obtain a first group of color channels and a second group of color channels, the first group of color channels including two color channels, and the second group of color channels including one color channel;

adjusting the gray-scale values of the subpixels of the first pixel point according to the first group of color channels and a first gamma curve in the preset visual compensation lookup table, the first gamma curve showing the adjustable maximum gray-scale values of the gray scales of the subpixels; and adjusting the gray-scale values of the subpixels of the second pixel point according to the second group of color channels and a second gamma curve in the preset visual compensation lookup table, the second gamma curve showing the adjustable minimum gray-scale values of the gray scales of the subpixels.

In some modified implementations of the first aspect of the present application, the step of adjusting the gray-scale values of the subpixels of the first pixel point according to the first group of color channels and a first gamma curve includes:

acquiring a first color channel and a second color channel from the first group of color channels;

acquiring the current gray-scale values of subpixel points of the first pixel point; and querying the first gamma curve on the first color channel and the second color channel according to the current gray-scale values of the subpixel points to obtain the adjusted gray-scale values.

In some modified implementations of the first aspect of the present application, the step of adjusting the gray-scale values of the subpixels of the second pixel point according to the second group of color channels and a second gamma curve includes:

acquiring a third color channel from the second group of color channels;

acquiring the current gray-scale values of subpixel points of the second pixel point; and querying the second gamma curve on the third color channel according to the current gray-scale values of the subpixel points to obtain the adjusted gray-scale values.

In some modified implementations of the first aspect of the present application, before the visually-compensated image data is determined, the method further includes:

determining a high-frequency area included in the first target image data by performing high-frequency detection on the first target image data;

acquiring a compensation gain intensity weight corresponding to the high-frequency area by looking up a preset visual compensation gain weight lookup table, the preset visual compensation gain weight lookup table including an inverse relationship between an area intensity value and the compensation gain intensity weight; and adjusting a viewing angle compensation gain value of the high-frequency area according to the compensation gain intensity weight, and outputting second target image data as the visually-compensated target image data.

In some modified implementations of the first aspect of the present application, before the visually-compensated image data is determined, the method further includes:

determining a flicker intensity value corresponding to the pixel point by performing flicker point detection on the first target image data;

acquiring a gain adjustment value corresponding to the flicker intensity value by looking up a preset flicker intensity gain adjustment table;

performing increment adjustment on the flicker intensity value according to the gain adjustment value to obtain a high-frequency intensity value corresponding to the pixel point;

acquiring a compensation gain intensity weight corresponding to the high-frequency intensity value by looking up the preset visual compensation gain weight lookup table; and adjusting a viewing angle compensation gain value of the high-frequency intensity value according to the compensation gain intensity weight, and outputting third target image data as the visually-compensated target image data.

In some modified implementations of the first aspect of the present application, the step of determining a flicker intensity value corresponding to the pixel point by performing flicker point detection on the first target image data includes:

selecting any one of the pixel points as a target pixel point from the plurality of pixel points included in the first target image data;

calculating a mean value of the target pixel point in neighbourhoods by utilizing a preset intensity detection template; and calculating a flicker intensity value corresponding to the target pixel point according to the mean value.

A second aspect of the present application provides a viewing angle compensation apparatus for a display panel, wherein the apparatus includes:

a receiving unit configured to receive to-be-processed image data, the image data including pixel points formed in a plurality of rows and a plurality of columns, and each pixel point having different subpixels on red, green and blue three-color channels;

a first adjustment unit configured to adjust current gray-scale values of the subpixels of the pixel point by looking up a preset visual compensation lookup table to obtain adjusted gray-scale values;

an output unit configured to output first target image data according to the adjusted gray-scale values corresponding to the subpixels; and a determination unit configured to take the first target image data as visually-compensated image data.

In some modified implementations of the second aspect of the present application, the first adjustment unit includes:

a division module configured to perform division in the plurality of pixel points included in the image data in a way of dividing two adjacent pixel points into a group to obtain a plurality of groups of pixel points, each group of pixel points including a first pixel point and a second pixel point;

the division module being further configured to divide the red, green and blue three-color channels into two groups to obtain a first group of color channels and a second group of color channels, the first group of color channels including two color channels, and the second group of color channels including one color channel;

an adjustment module configured to adjust the gray-scale values of the subpixels of the first pixel point according to the first group of color channels and a first gamma curve in the preset visual compensation lookup table, the first gamma curve showing the adjustable maximum gray-scale values of the gray scales of the subpixels; and the adjustment module being further configured to adjust the gray-scale values of the subpixels of the second pixel point according to the second group of color channels and a second gamma curve in the preset visual compensation lookup table, the second gamma curve showing the adjustable minimum gray-scale values of the gray scales of the subpixels.

In some modified implementations of the second aspect of the present application, the adjustment module includes:

a first acquisition submodule configured to acquire a first color channel and a second color channel from the first group of color channels;

the first acquisition submodule being further configured to acquire the current gray-scale values of subpixel points of the first pixel point; and a first query submodule configured to query the first gamma curve on the first color channel and the second color channel according to the current gray-scale values of the subpixel points to obtain the adjusted gray-scale values.

In some modified implementations of the second aspect of the present application, the adjustment module includes:

a second acquisition submodule configured to acquire a third color channel from the second group of color channels;

the second acquisition submodule being further configured to acquire the current gray-scale values of subpixel points of the second pixel point; and a second query submodule configured to query the second gamma curve on the third color channel according to the current gray-scale values of the subpixel points to obtain the adjusted gray-scale values.

In some modified implementations of the second aspect of the present application, the apparatus further includes:

a first detection unit configured to determine a high-frequency area included in the first target image data by performing high-frequency detection on the first target image data;

a first acquisition unit configured to acquire a compensation gain intensity weight corresponding to the high-frequency area by looking up a preset visual compensation gain weight lookup table, the preset visual compensation gain weight lookup table including an inverse relationship between an area intensity value and the compensation gain intensity weight; and a second adjustment unit further configured to adjust a viewing angle compensation gain value of the high-frequency area according to the compensation gain intensity weight, and output second target image data as the visually-compensated target image data.

In some modified implementations of the second aspect of the present application, the apparatus further includes:

a second detection unit configured to determine a flicker intensity value corresponding to the pixel point by performing flicker point detection on the first target image data;

a second acquisition unit configured to acquire a gain adjustment value corresponding to the flicker intensity value by looking up a preset flicker intensity gain adjustment table;

a third adjustment unit configured to perform increment adjustment on the flicker intensity value according to the gain adjustment value to obtain a high-frequency intensity value corresponding to the pixel point;

the second acquisition unit being further configured to acquire a compensation gain intensity weight corresponding to the high-frequency intensity value by looking up the preset visual compensation gain weight lookup table; and the third adjustment unit being further configured to adjust a viewing angle compensation gain value of the high-frequency intensity value according to the compensation gain intensity weight, and output third target image data as the visually-compensated target image data.

In some modified implementations of the second aspect of the present application, the second detection unit includes:

a selection module configured to select any one of the pixel points as a target pixel point from the plurality of pixel points included in the first target image data;

a calculation module configured to calculate a mean value of the target pixel point in neighbourhoods by utilizing a preset intensity detection template; and the calculation module being further configured to calculate a flicker intensity value corresponding to the target pixel point according to the mean value.

A third aspect of the present application provides a display panel, including the above-mentioned viewing angle compensation apparatus for the display panel.

A fourth aspect of the present application provides a computer-readable storage medium, wherein the computer-readable storage medium stores a computer program, and a processor, when executing the computer program, implementing the above-mentioned viewing angle compensation method for the display panel.

A fifth aspect of the present application provides an electronic device, including a memory, a processor and a computer program stored in the memory and capable of running on the processor, and the processor, when executing the computer program, implementing the above-mentioned viewing angle compensation method for the display panel.

According to the above-mentioned technical solutions, the technical solutions provided by the present disclosure at least have the following advantages:

the present disclosure provides a viewing angle compensation method and apparatus for a display panel, and the display panel. In the present disclosure, a visual compensation lookup table is reset, and the adjustable maximum gray-scale values of gray scales of subpixels and the adjustable minimum gray-scale values of the gray scales of the subpixels are shown by utilizing the visual compensation lookup table. In that way, for three subpixels of each pixel point on red, green and blue three-color channels, an adjustable range corresponding to the current gray-scale value of each subpixel can be obtained by looking up this visual compensation lookup table, and thus, the adjustment (i.e. luminance adjustment) for a gray-scale value of one pixel point is achieved; and therefore, target image data is output as visually-compensated image data by integrating an adjustment result of each pixel point in the image data. Compared with the prior art, the problem that an existing method has a poor effect on relieving the phenomenon of picture whitening is solved.

In the present disclosure, by adjusting gray-scale values of different subpixels of each pixel point on the red, green and blue three-color channels, the purpose of increasing a visual angle of an MVA liquid crystal panel is achieved, the problem of picture whitening on a screen watched at a side viewing angle is avoided as much as possible, the demand of a user watching the screen at multiple angles is greatly satisfied, and the use experience of the user is improved.

The above-mentioned description is merely a summary of the technical solutions of the present disclosure. In order to more clearly know about the technical means of the present disclosure, they may be implemented according to the content of the description. Moreover, in order to make the above-mentioned and other objectives, features, and advantages of the present disclosure more obvious and comprehensible, the specific implementations of the present disclosure will be listed below.

BRIEF DESCRIPTION OF THE DRAWINGS

By reading detailed descriptions of the following preferred implementations, various other advantages and benefits will become more apparent for those of ordinary skill in the art. The accompanying drawings are merely for the purpose of showing the preferred implementations, but are not regarded as limitations on the present disclosure. Moreover, in the entire accompanying drawings, the same reference numeral shows the same component. In the accompanying drawings:

FIG. 6 shows a preset intensity detection template illustrated in an embodiment of the present disclosure;

DETAILED DESCRIPTION OF THE INVENTION

Exemplary embodiments of the present disclosure will be described in more detail below with reference to the accompanying drawings. Although the exemplary embodiments of the present disclosure are shown in the accompanying drawings, it should be understood that the present disclosure can be implemented in various forms, but should not be limited by the embodiments described herein. On the contrary, these embodiments are provided for understanding the present disclosure more thoroughly and integrally transmitting the scope of the present disclosure to the skilled in the art.

Figure 1:
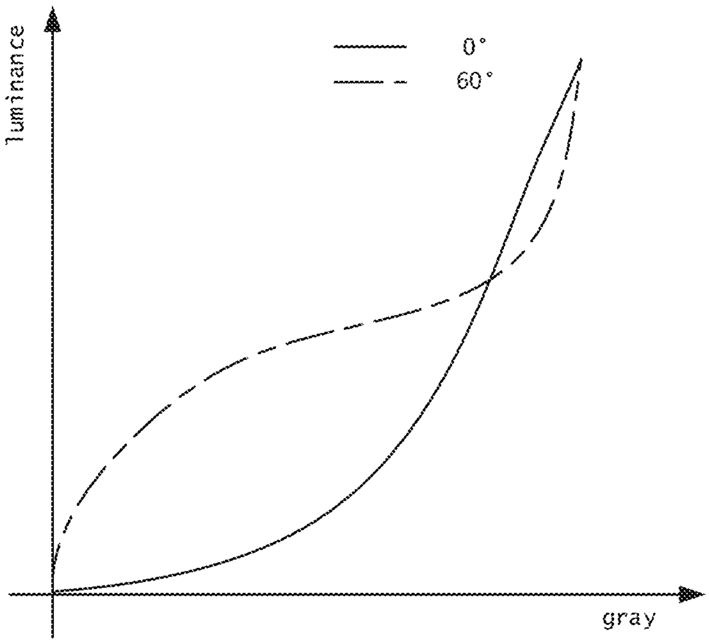
FIG. 1 is a diagram showing a tendency of a luminance change curve of a screen watched at a 0-DEG front viewing angle and a 60-DEG side viewing angle illustrated in an embodiment of the present disclosure.
Figure 2:
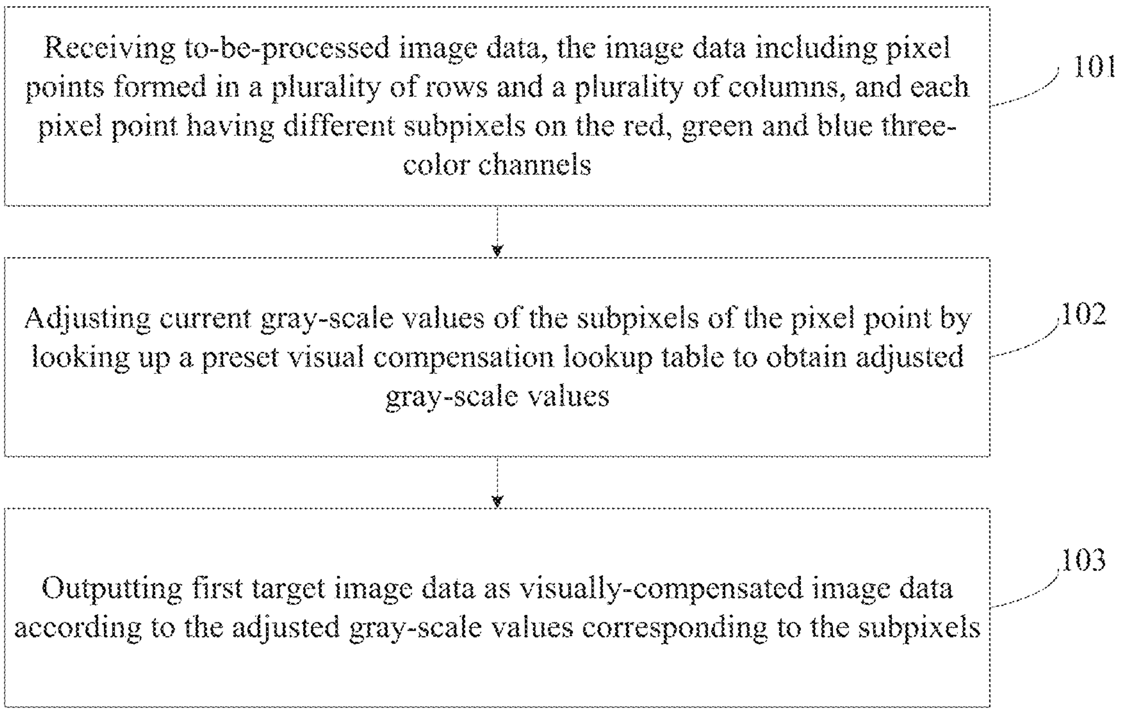
FIG. 2 is a diagram showing a process of a viewing angle compensation method for a display panel in an embodiment of the present disclosure.

An embodiment of the present disclosure provides a viewing angle compensation method for a display panel, as shown in FIG. 2, the method aims at achieving the purpose of increasing a visual angle of an MVA liquid crystal panel by adjusting gray-scale values of different subpixels of each pixel point on red, green and blue three-color channels, and therefore, in an embodiment of the present disclosure, the specific steps are provided as follows.

Step 101, to-be-processed image data is received, the image data including pixel points formed in a plurality of rows and a plurality of columns, and each pixel point having different subpixels on the red, green and blue three-color channels.

The to-be-processed image data refers to image data obtained after a signal input from the outside is received and correspondingly processed by the MVA liquid crystal panel, and the image data is further required to be further processed to be outputted and displayed as a picture effect for a user.

Red, green and blue colors are often-said optical three-primary colors referred to as RGB colors for short. In a RGB color mode, a RGB model is used to allocate an intensity value within the range of 0-255, i.e. an intensity value of each subpixel on the red, green and blue three-color channels, for a RGB component of each pixel in an image. 16777216 colors can recur on the screen by only using the three colors in the RGB image and mixing the three colors according to different proportions.

Step 102, current gray-scale values of the subpixels of the pixel point are adjusted by looking up a preset visual compensation lookup table to obtain adjusted gray-scale values.

Gray scales represent different luminance levels between a darkest area and a brightest area. The RGB color mode is utilized to allocate different subpixels for each pixel point on the red, green and blue three-color channels, and a light source at the back of each subpixel can show different luminance levels. The more the middle levels are, the more delicate the showable picture effect is. For example, with an 8-bit panel as an example, the eighth power of two is equal to 256 luminance levels referred to as 256 gray scales.

Figure 3:
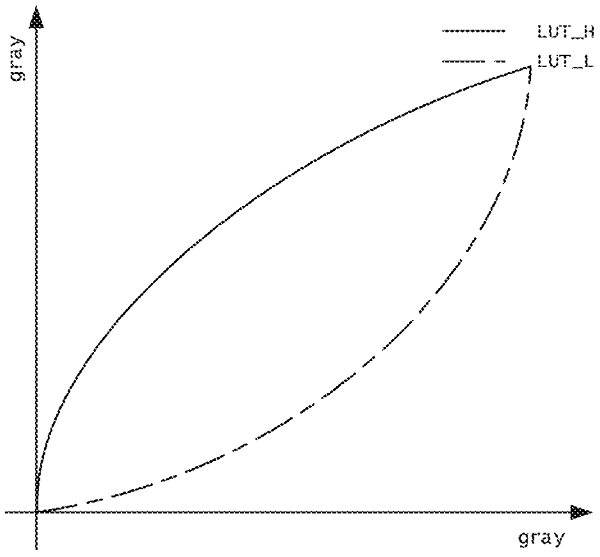
FIG. 3 is a diagram showing change tendencies of two corresponding gamma curves included in a preset visual compensation lookup table in an embodiment of the present disclosure.

The preset visual compensation lookup table includes a first gamma curve and a second gamma curve, the first gamma curve shows the adjustable maximum gray-scale values of the gray scales of the subpixels, the second gamma curve shows the adjustable minimum gray-scale values of the gray scales of the subpixels, and the two gamma curves are equivalent to two corresponding curves by which corresponding adjustable ranges of the gray-scale values of the subpixels can be described. As shown in FIG. 3 which is a diagram showing change tendencies of the two corresponding gamma curves included in the preset visual compensation lookup table, in FIG. 3, horizontal coordinates represent to-be-adjusted gray-scale values, vertical coordinates represent adjusted gray-scale values, one gamma curve (e.g. a full line shown in FIG. 3 can be self-defined as the first gamma curve identified as LUT_H) represents the adjustable maximum value of a gray-scale value, and the other gamma curve (e.g. a dotted line shown in FIG. 3 can be self-defined as the second gamma curve identified as LUT_L) represents the adjustable minimum value of a gray-scale value. In that way, for arbitrarily selected gray-scale values on the horizontal coordinates, two corresponding gray-scale values, i.e. the adjustable maximum and minimum values, can be looked up on the vertical coordinates according to the two corresponding gamma curves, and then, the corresponding adjustable ranges of the selected gray-scale values are further obtained.

In an embodiment of the present disclosure, with reference to FIG. 3, the gray-scale values of the corresponding subpixels of each pixel point can be adjusted. The specific implementation process is that, with one of the subpixels as an example, the current gray-scale value of the subpixel is acquired, then, the two corresponding gamma curves included in the preset visual compensation lookup table are looked up, the current gray-scale value is taken as a value on the horizontal coordinates, in that way, a gray-scale value corresponding to the vertical coordinates, i.e. an adjustable range of the gray-scale value corresponding to the subpixel, can be looked up on the two gamma curves, further, the gray-scale value of the subpixel is adjusted according to this range, and thus, the adjustment for the gray-scale values of the three subpixels corresponding to each pixel point is completed.

It should be noted that a rule for adjusting the gray-scale values of the subpixels according to the adjustable range includes, but is not limited to direct selection of the values on the gamma curves (i.e. the adjustable maximum and minimum values) for completing the operation of adjusting the gray-scale values.

Step 103, first target image data is output as visually-compensated image data according to the adjusted gray-scale values corresponding to the subpixels.

In an embodiment of the present disclosure, the image data is taken as the output target image data after being subjected to luminance adjustment according to the adjusted gray-scale values respectively corresponding to the three subpixels of each pixel point to show a picture effect for a user, which is equivalent to indirect increment of the visual angle of the liquid crystal panel, so that the user can clearly see a normal display effect or a display effect consistent to or approximate to that at a front viewing angle as much as possible under the condition that a display picture of the screen is watched at different side viewing angles, and the phenomenon of picture whitening is avoided.

It should be noted that, in an embodiment of the present disclosure, the image data adjusted by utilizing the preset visual compensation lookup table is identified as the first target image data so as to be clearly distinguished from image data further adjusted later by using other methods.

An embodiment of the present disclosure provides a viewing angle compensation method for a display panel. In the embodiment of the present disclosure, a visual compensation lookup table is reset, and the adjustable maximum gray-scale values of gray scales of subpixels and the adjustable minimum gray-scale values of the gray scales of the subpixels are shown by utilizing the visual compensation lookup table. In that way, for three subpixels of each pixel point on red, green and blue three-color channels, an adjustable range corresponding to the current gray-scale value of each subpixel can be obtained by looking up this visual compensation lookup table, and thus, the adjustment (i.e. luminance adjustment) for a gray-scale value of one pixel point is achieved; and therefore, target image data is output as visually-compensated image data by integrating an adjustment result of each pixel point in the image data. Compared with the prior art, the problem that an existing method has a poor effect on relieving the phenomenon of picture whitening is solved. In the present disclosure, by adjusting gray-scale values of different subpixels of each pixel point on the red, green and blue three-color channels, the purpose of increasing a visual angle of an MVA liquid crystal panel is achieved, the problem of picture whitening on a screen watched at a side viewing angle is avoided as much as possible, the demand of a user watching the screen at multiple angles is greatly satisfied, and the use experience of the user is improved.

Figure 4:
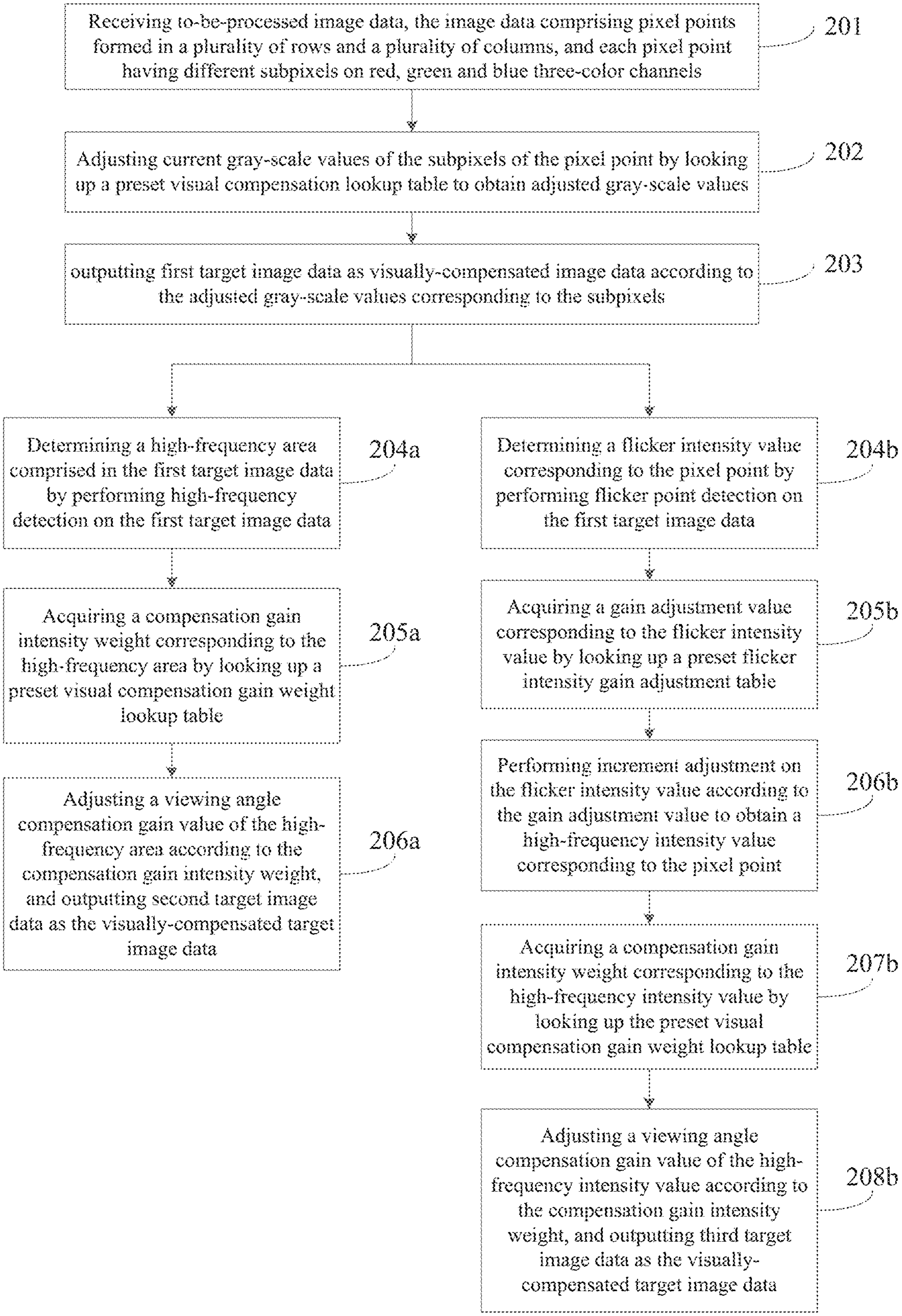
FIG. 4 is a diagram showing a process of another viewing angle compensation method for a display panel in an embodiment of the present disclosure.

In order to describe the above-mentioned embodiments in more detail, an embodiment of the present disclosure further provides another viewing angle compensation method for a display panel, as shown in FIG. 4, the method aims at explaining and describing the above-mentioned embodiments in more details, and therefore, the embodiment of the present disclosure provides the following specific steps.

Step 201, to-be-processed image data is received, the image data including pixel points formed in a plurality of rows and a plurality of columns, and each pixel point having different subpixels on red, green and blue three-color channels.

In an embodiment of the present disclosure, the explanation and description for the present step refer to those in step 101, the descriptions thereof will be omitted herein.

Step 202, current gray-scale values of the subpixels of the pixel point are adjusted by looking up a preset visual compensation lookup table to obtain adjusted gray-scale values.

The preset visual compensation lookup table includes a first gamma curve and a second gamma curve, the first gamma curve shows the adjustable maximum gray-scale values of the gray scales of the subpixels, the second gamma curve shows the adjustable minimum gray-scale values of the gray scales of the subpixels, and the two corresponding gamma curves are used for describing corresponding adjustable ranges of the gray-scale values. Specifically, the schematic diagram illustrated in FIG. 3 can be constructed by adopting a relationship between the adjustable maximum value (identified as LUT_H) and the adjustable minimum value (identified as LUT_L) of a gray-scale value given according to the following formula (1).

$$2\left(\frac{gray}{255}\right)^{2.2} = \left[\frac{LUT\_H(gray)}{255}\right]^{2.2} + \left[\frac{LUT\_L(gray)}{255}\right]^{2.2}. \tag{1}$$

In an embodiment of the present disclosure, step 202 can be explained and described in detail as follows.

Step 1, two adjacent pixel points are divided into a group in the plurality of pixel points included in the image data to obtain a plurality of groups of pixel points, wherein each group of pixel points includes a first pixel point and a second pixel point.

For the embodiment of the present disclosure, the purpose of adjusting the current gray-scale values of the three subpixels of each pixel point is to adjust the entire luminance effect of the image data, which requires the balance of the operation of adjusting the luminance, rather than random enhancement or weakening in certain areas, and thus, adverse effects on the presentation of the original image data are also avoided.

In view of the above-mentioned factors, a balance adjustment operation given in an embodiment of the present disclosure is that: firstly, the plurality of pixel points included in the image data are divided into a plurality of groups in a way of dividing two adjacent pixel points into a group, then, each group is subjected to gray-scale adjustment, and finally, the entire luminance effect of the image data is adjusted. However, it should to be noted that, for facilitating distinguishing two pixel points in one group, one of the pixel points is identified as a first pixel point, the other pixel point is identified as a second pixel point, words "first" and "second" are only used as identifiers, in that way, the first pixel point and the second pixel point in each group are arranged in random order.

Exemplarily, the way of dividing two adjacent pixel points into a group may include, but not limited to: for each row of pixel points, two adjacent pixel points are divided into a group; for each column of pixel points, two adjacent pixel points are divided into a group; for pixel points not in the same row or the same column, two adjacent pixel points are divided into a group. Further, in the embodiment of the present disclosure, the plurality of pixel points in the image data are processed in the way that two adjacent pixel points are divided into a group, in that way, for two pixel points in one group, their subpixels are also adjacent on the same color channel.

Step 2, the red, green and blue three-color channels are divided into two groups to obtain a first group of color channels and a second group of color channels, wherein the first group of color channels include two color channels, and the second group of color channels include one color channel.

In an embodiment of the present disclosure, the red, green and blue three-color channels are divided into two groups, so that one group includes two color channels, and the other group includes one color channel. In that way, when the gray-scale values of the subpixels are adjusted on the basis of the red, green and blue three-color channels, in a case that one pixel point has three subpixels, the situation that the gray-scale values of the three subpixels are all increased or reduced is avoided by adopting different gray-scale adjustment ways for the two groups of color channels, so that the adjustment for each pixel point is balanced, and finally, the luminance balance adjustment for the entire image data is more favorably achieved.

Exemplarily, in the case that one pixel point has three subpixels, if the gray-scale values of the subpixels are respectively increased on the red channel and the green channel, in that way, correspondingly, the gray-scale values of the subpixels are required to be reduced on the blue channel. The above descriptions are illustrative examples emphasized in that the situation that the gray-scale values of the subpixels are all increased or reduced on the three color channels at the same time is avoided.

Step 3, the gray-scale values of the subpixels of the first pixel point are adjusted according to the first group of color channels and the first gamma curve, and the gray-scale values of the subpixels of the second pixel point are adjusted according to the second group of color channels and the second gamma curve.

Specifically, an implementation process is that a first color channel and a second color channel are acquired from the first group of color channels; the current gray-scale values of subpixel points of the first pixel point are acquired; and the first gamma curve is queried on the first color channel and the second color channel according to the current gray-scale values of the subpixel points to obtain the adjusted gray-scale values.

Specifically, a third color channel is acquired from the second group of color channels; the current gray-scale values of subpixel points of the second pixel point are acquired; and the second gamma curve is queried on the third color channel according to the current gray-scale values of the subpixel points to obtain the adjusted gray-scale values.

In an embodiment of the present disclosure, it should to be noted that the first pixel point and the second pixel point in each group of pixel points are relative, that is, they are used for distinguishing two pixel points, if one of the pixel points is regarded as the first pixel point, the other pixel point is relatively regarded as the second pixel point.

Figure 5:
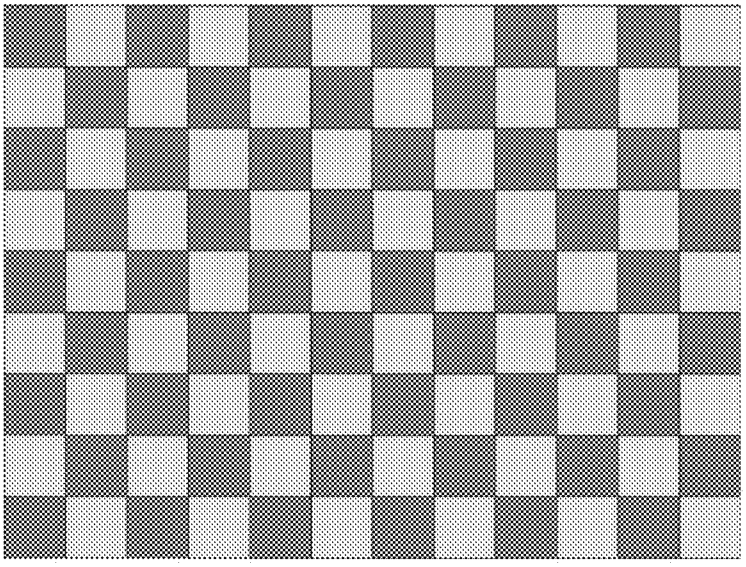
FIG. 5 shows an adjusting effect of a plurality of subpixels on a red channel illustrated in an embodiment of the present disclosure.

Exemplarily, for a red channel, the gray-scale values of the subpixels of the first pixel point are adjusted according to the first gamma curve, the gray-scale values of the subpixels of the second pixel point are adjusted according to the second gamma curve, in that way, a display effect shown in FIG. 5 is obtained by integrating adjustment effects of the plurality of pixel points on the red channel. It should to be noted that the first pixel point and the second pixel point mentioned in the embodiment of the present disclosure are not limited in order, then, various display effect diagrams can also be obtained, but it is also ensured that the two adjacent subpixels are adjusted in a way that one is higher than the other one, which is not exhaustive herein. Further, in an embodiment of the present disclosure, when the operation of adjusting the gray-scale values of the subpixels is performed according to the first gamma curve and the second gamma curve, the operation is separately performed according to the first group of color channels and the second group of color channels, and for the different groups of color channels, the adjustment ways are different, that is, one is higher than the other one. In that way, for the subpixels of one pixel point on the three color channels, the situation that the gray-scale values of the three subpixels are increased or reduced at the same time is avoided.

Step 203, first target image data is output according to the adjusted gray-scale values corresponding to the subpixels.

In an embodiment of the present disclosure, after the luminance effects of the first pixel point and the second pixel point in each group of pixel points are adjusted, the target image data is acquired by integrating each group of pixel points.

The above-mentioned data is the target image data obtained after the luminance effect is adjusted by utilizing the preset visual compensation lookup table, and it can be identified as first target image data. However, after such processing, there may be some high-frequency texture areas or isolated areas and isolated points (e.g. flicker points); in following embodiments of the present disclosure, an implementation process of luminance effect adjustment for the high-frequency texture areas will be further given in steps 204*a* to 206*a*, and an implementation process of luminance effect adjustment for the flicker points will be further given in steps 204*b* to 208*b*, so that the picture display effect of the screen is better adjusted, and finally, the purpose of increasing the side viewing angle is better achieved.

It should be noted that steps 204*a* to 206*a* are optimized solutions for processing the high-frequency texture areas, steps 204*b* to 208*b* are optimized solutions for processing the isolated areas and the isolated points, and the both are independent from each other. In that way, it is not limited to better process the first target image data output in step 203 by adopting an optimized solution formed by combining a parallel or progressive way.

The following embodiments of the present disclosure are mainly described according to the optimized solution formed by combining the parallel way.

Step 204*a*, a high-frequency area included in the first target image data is determined by performing high-frequency detection on the first target image data.

In an embodiment of the present disclosure, the intensity of the high-frequency area may be determined by performing high-frequency detection on the input first target image data by using a detection operator. Specifically, the high-frequency detection factor may be, but is not limited to a classical sobel operator, a laplace operator and an 8-neighbourhood detection operator.

Step 205*a*, a compensation gain intensity weight corresponding to the high-frequency area is acquired by looking up a preset visual compensation gain weight lookup table.

The gain of the screen is the capacity of the screen reflecting incident light. Under the condition that the angle of the incident light is constant and the flux of the incident light is unchanged, a ratio of the luminance of the screen in a certain direction and the luminance in an ideal state is referred to as a luminance coefficient in this direction, the maximum value thereof is referred to as the gain of the screen. Generally, the gain of a lusterless white wall is defined as 1, if the gain of the screen is smaller than 1, the incident light will be weakened; and if the gain of the screen is greater than 1, more incident light will be reflected or refracted.

In that way, a compensation gain weight may be understood as that: gain=(gray-LUT_H(gray), the compensation gain weight is [0, 1], that is, the final gain is gain*compensation gain weight.

The preset visual compensation gain weight lookup table may include a compensation intensity adjustment curve for the high-frequency area, and it shows an inverse relationship between an area intensity value and the compensation gain intensity weight.

In an embodiment of the present disclosure, for the high-frequency area, its luminance effect is stronger, in that way, in view of the gain of the screen, the corresponding compensation gain weight can be obtained by looking up the preset visual compensation gain weight lookup table, so that the adjustment intensity of the original gray-scale value is reduced, or gray-scale adjustment (i.e. equal to the original value) is not performed, and then, the purpose of reducing the viewing angle compensation gain of the high-frequency area is achieved.

Step 206*a*, a viewing angle compensation gain value of the high-frequency area is adjusted according to the compensation gain intensity weight, and second target image data is output as the visually-compensated target image data.

In an embodiment of the present disclosure, the viewing angle compensation gain value of the high-frequency area is adjusted to obtain the target image data identified as second target image data, which is equivalent to that the high-frequency area existing in the first target image data is subjected to luminance effect adjustment to serve as a picture effect diagram output by the liquid crystal panel, so that the first target image data obtained in step 203 is further improved, and finally, the purpose of increasing the side viewing angle is better achieved.

Step 204*b*, a flicker intensity value corresponding to the pixel point is determined by performing flicker point detection on the first target image data.

The flicker points refer to isolated point areas or noise point areas in the image data, the previous frames of these areas are in a dark state, next frames thereof are in a bright state, and therefore, the problem of interframe flickering occurs.

In an embodiment of the present disclosure, the implementation process of the flicker point detection in the present step may include the following steps.

Firstly, any one of the pixel points is selected as a target pixel point from the plurality of pixel points included in the first target image data; and a mean value of the target pixel point in neighbourhoods is calculated by utilizing a preset intensity detection template.

The preset intensity detection template may be a 3×3, 5×5 or 7×7 intensity detection template. As shown in FIG. 6 illustrating the 3×3 intensity detection template, wherein P (x, y) is the current target pixel point, other pixel points are its neighbourhoods. In that way, the mean value of the target pixel point in the neighbourhoods may be calculated by adopting the following formula (2):

$$\text{block\_mean}=(p(x-1,y-1)+p(x,y-1)+p(x+1,y+1)+p(x-1,y)+p(x,y)+p(x+1,y)+p(x-1,y+1)+p(x,y+1)+p(x+1,y+1))/9;$$

Secondly, a flicker intensity value corresponding to the target pixel point is calculated according to the mean value.

In an embodiment of the present disclosure, the flicker intensity value corresponding to the target pixel point may be calculated by adopting the following formula (3):

$$\text{flicker\_intensity}=((p(x-1,y-1)-\text{block\_mean})^2+(p(x,y-1)-\text{block\_mean})^2+(p(x+1,y-1)-\text{block\_mean})^2+(p(x-1,y)-\text{block\_mean})^2+(p(x,y)-\text{block\_mean})^2+(p(x+1,y)-\text{block\_mean})^2+(p(x-1,y+1)-\text{block\_mean})^2+(p(x,y+1)-\text{block\_mean})^2+(p(x+1,y+1)-\text{block\_mean})^2)/9,$$

Step 205*b*, a gain adjustment value corresponding to the flicker intensity value is acquired by looking up a preset flicker intensity gain adjustment table.

The preset flicker intensity gain adjustment table may include a flicker intensity gain adjustment curve, by which the gain adjustment value corresponding to the target pixel point is further obtained and is used for adjusting the flicker intensity value corresponding to the pixel point.

In an embodiment of the present disclosure, the gain adjustment value described herein is a high-frequency intensity adjustment gain, and the high-frequency intensity value is increased after adjustment.

Step 206*b*, increment adjustment is performed on the flicker intensity value according to the gain adjustment value to obtain a high-frequency intensity value corresponding to the pixel point.

In an embodiment of the present disclosure, for steps 205*b* to 206*b*, after the flicker intensity of each pixel point is calculated, the preset flicker intensity gain adjustment table is queried by using this flicker intensity value to obtain a specific gain adjustment value, this gain adjustment value is multiplied by the flicker intensity value of the pixel point to achieve the luminance increment adjustment of the pixel point, and then, a high-frequency intensity value is obtained. For one pixel point, it is also equivalent to a high-frequency area, in that way, the subsequent operation of luminance effect adjustment can be performed by adopting the preset visual compensation gain weight lookup table involved in steps 204*a* to 206*a*.

Step 207*b*, a compensation gain intensity weight corresponding to the high-frequency intensity value is acquired by looking up the preset visual compensation gain weight lookup table.

Step 208*b*, a viewing angle compensation gain value of the high-frequency intensity value is adjusted according to the compensation gain intensity weight, and third target image data is output as the visually-compensated target image data.

In an embodiment of the present disclosure, steps 207*b* to 208*b* are adjustment operation for the pixel point having the high-frequency intensity value. Specifically, the corresponding compensation gain intensity weight is acquired from the preset visual compensation gain weight lookup table, then, the luminance effect of the pixel point is balanced by utilizing this compensation gain intensity weight to obtain the target image data identified as the third target image data, which is equivalent to that a flicker point appearing in the first target image data is further better processed to serve as a picture effect diagram output by the liquid crystal panel, so that the first target image data obtained in step 203 is further improved, and finally, the purpose of increasing the side viewing angle is better achieved.

Figure 7:
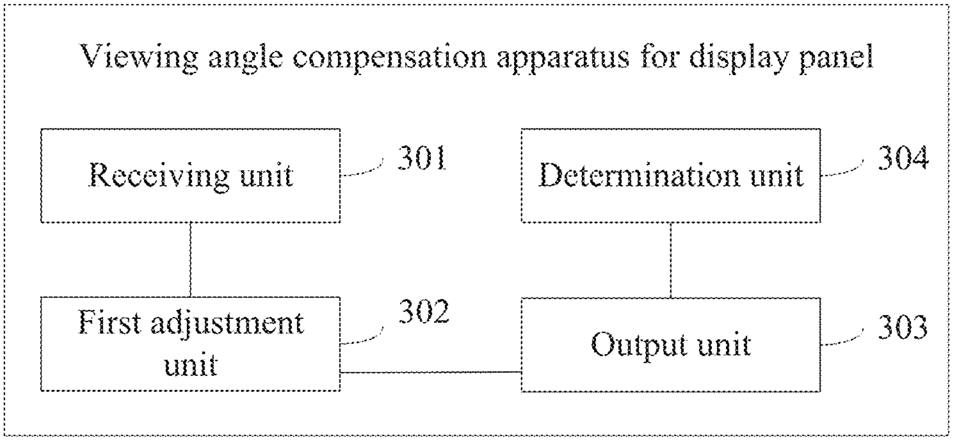
FIG. 7 is a composition block diagram of a viewing angle compensation apparatus for a display panel in an embodiment of the present disclosure.

Further, as an implementation of the above-mentioned method as shown in FIG. 2 and FIG. 4, an embodiment of the present disclosure provides a viewing angle compensation apparatus for a display panel. The apparatus embodiment corresponds to the above-mentioned method embodiment. For facilitating reading, detailed contents in the above-mentioned method embodiment will not be described one by one in the present apparatus embodiment, however, it should be cleared that the apparatus in the present embodiment may correspondingly implement all the contents in the above-mentioned method embodiment. The apparatus is applied for increasing the visual angle of an MVA liquid crystal panel and further relieving the phenomenon of picture whitening watched at the side viewing angle. Specifically, as shown in FIG. 7, the apparatus includes:

a receiving unit 301 configured to receive to-be-processed image data, the image data including pixel points formed in a plurality of rows and a plurality of columns, and each pixel point having different subpixels on red, green and blue three-color channels;

a first adjustment unit 302 configured to adjust current gray-scale values of the subpixels of the pixel point by looking up a preset visual compensation lookup table to obtain adjusted gray-scale values;

an output unit 303 configured to output first target image data according to the adjusted gray-scale values corresponding to the subpixels; and a determination unit 304 configured to take the first target image data as visually-compensated image data.

Figure 8:
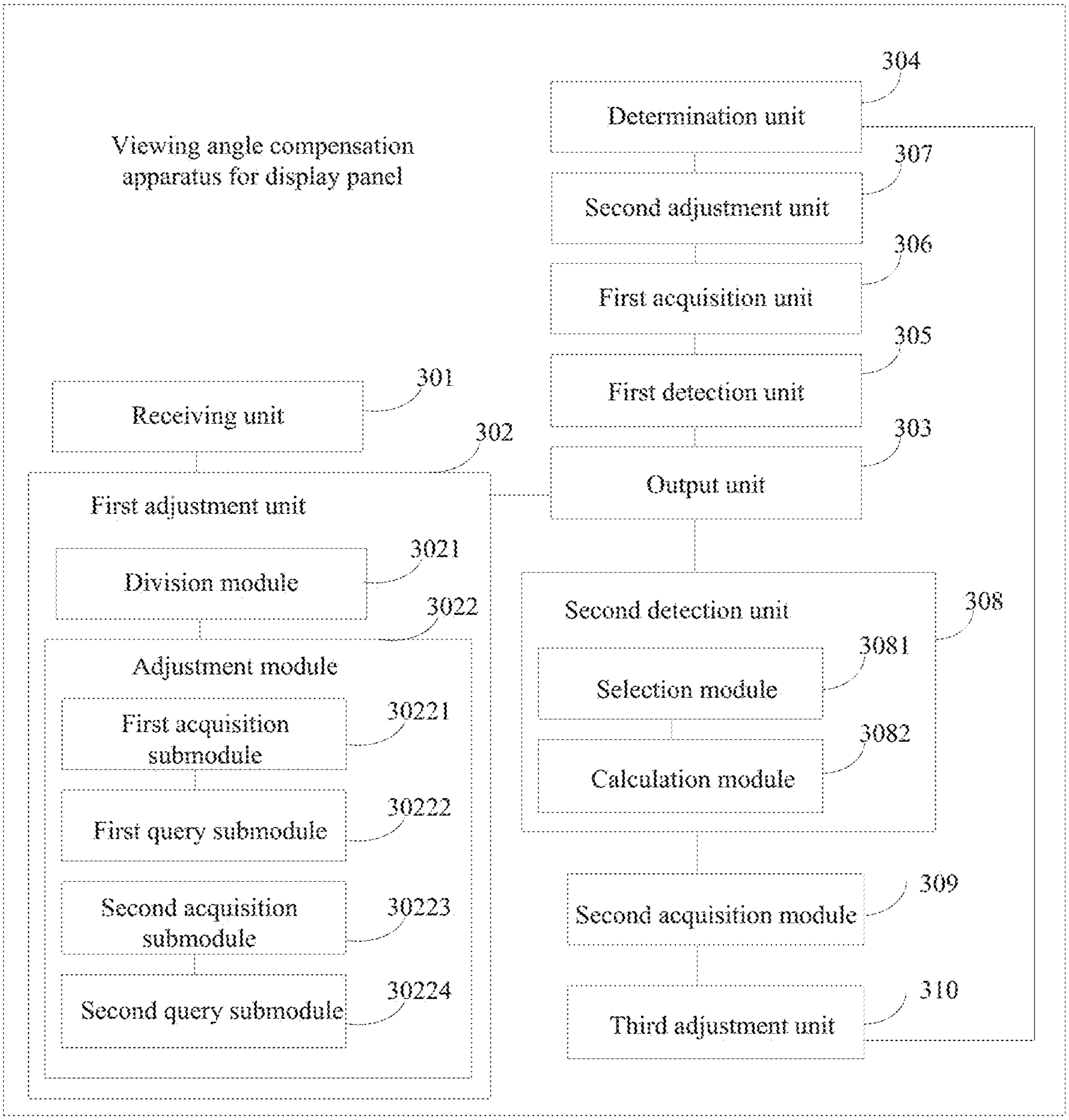
FIG. 8 is a composition block diagram of another viewing angle compensation apparatus for a display panel in an embodiment of the present disclosure.

Further, as shown in FIG. 8, the first adjustment unit 302 includes:

a division module 3021 configured to perform division in the plurality of pixel points included in the image data in a way of dividing two adjacent pixel points into a group to obtain a plurality of groups of pixel points, each group of pixel points including a first pixel point and a second pixel point;

the division module 3021 being further configured to divide the red, green and blue three-color channels into two groups to obtain a first group of color channels and a second group of color channels, the first group of color channels including two color channels, and the second group of color channels including one color channel;

an adjustment module 3022 configured to adjust the gray-scale values of the subpixels of the first pixel point according to the first group of color channels and a first gamma curve in the preset visual compensation lookup table, the first gamma curve showing the adjustable maximum gray-scale values of the gray scales of the subpixels; and the adjustment module 3022 being further configured to adjust the gray-scale values of the subpixels of the second pixel point according to the second group of color channels and a second gamma curve in the preset visual compensation lookup table, the second gamma curve showing the adjustable minimum gray-scale values of the gray scales of the subpixels.

Further, as shown in FIG. 8, the adjustment module 3022 includes:

a first acquisition submodule 30221 configured to acquire a first color channel and a second color channel from the first group of color channels;

the first acquisition submodule 30221 being further configured to acquire the current gray-scale values of subpixel points of the first pixel point; and a first query submodule 30222 configured to query the first gamma curve on the first color channel and the second color channel according to the current gray-scale values of the subpixel points to obtain the adjusted gray-scale values.

Further, as shown in FIG. 8, the adjustment module 3022 includes:

a second acquisition submodule 30223 configured to acquire a third color channel from the second group of color channels;

the second acquisition submodule 30223 being further configured to acquire the current gray-scale values of subpixel points of the second pixel point; and a second query submodule 30224 configured to query the second gamma curve on the third color channel according to the current gray-scale values of the subpixel points to obtain the adjusted gray-scale values.

Further, as shown in FIG. 8, the apparatus further includes:

a first detection unit 305 configured to determine a high-frequency area included in the first target image data by performing high-frequency detection on the first target image data;

a first acquisition unit 306 configured to acquire a compensation gain intensity weight corresponding to the high-frequency area by looking up a preset visual compensation gain weight lookup table, the preset visual compensation gain weight lookup table including an inverse relationship between an area intensity value and the compensation gain intensity weight; and a second adjustment unit 307 further configured to adjust a viewing angle compensation gain value of the high-frequency area according to the compensation gain intensity weight, and output second target image data as the visually-compensated target image data.

Further, as shown in FIG. 8, the apparatus further includes:

a second detection unit 308 configured to determine a flicker intensity value corresponding to the pixel point by performing flicker point detection on the first target image data;

a second acquisition unit 309 configured to acquire a gain adjustment value corresponding to the flicker intensity value by looking up a preset flicker intensity gain adjustment table;

a third adjustment unit 310 configured to perform increment adjustment on the flicker intensity value according to the gain adjustment value to obtain a high-frequency intensity value corresponding to the pixel point;

the second acquisition unit 309 being further configured to acquire a compensation gain intensity weight corresponding to the high-frequency intensity value by looking up the preset visual compensation gain weight lookup table; and the third adjustment unit 310 being further configured to adjust a viewing angle compensation gain value of the high-frequency intensity value according to the compensation gain intensity weight, and output third target image data as the visually-compensated target image data.

Further, as shown in FIG. 8, the second detection unit 308 includes:

a selection module 3081 configured to select any one of the pixel points as a target pixel point from the plurality of pixel points included in the first target image data;

a calculation module 3082 configured to calculate a mean value of the target pixel point in neighbourhoods by utilizing a preset intensity detection template; and the calculation module 3082 being further configured to calculate a flicker intensity value corresponding to the target pixel point according to the mean value.

In conclusion, embodiments of the present disclosure provide a viewing angle compensation method and apparatus for a display panel. In the embodiments of the present disclosure, a visual compensation lookup table is reset, this table includes two corresponding gamma curves for describing an adjustable range of a certain gray-scale value. Then, for each pixel point included in to-be-processed image data and having different subpixels on red, green and blue three-color channels, adjustable ranges corresponding to the current gray-scale values of the different subpixels can be obtained by looking up this visual compensation lookup table, and thus, the adjustment (i.e. luminance adjustment) for a gray-scale value of one pixel point is achieved; and therefore, first target image data is output by integrating an adjustment result of each pixel point in the image data. Moreover, the luminance effects of high-frequency texture areas and flicker points possibly included in the first target image data are further adjusted and optimized. The final purposes of the embodiments of the present disclosure are to achieve the purpose of increasing a visual angle of an MVA liquid crystal panel, avoid the problem of picture whitening on a screen watched at a side viewing angle as much as possible, greatly satisfy the demand of a user watching the screen at multiple angles, and improve the use experience of the user.

The viewing angle compensation for the display panel includes a processor and a memory, the above-mentioned receiving unit, first adjustment unit, output unit and determination unit are all used as the program units to be stored in the memory, and the processor executes the above-mentioned program units stored in the memory to implement the corresponding functions.

The processor includes a kernel which calls corresponding program units from the memory. One or more kernels may be set. By adjusting parameters of the kernel, gray-scale values of different subpixels on each pixel point are adjusted on red, green and blue three-color channels, so that the purpose of increasing a visual angle of an MVA liquid crystal panel is achieved, the problem of picture whitening on a screen watched at a side viewing angle is avoided as much as possible, the demand of a user watching the screen at multiple angles is greatly satisfied, and the use experience of the user is improved.

An embodiment of the present disclosure provides a display panel, including the above-mentioned viewing angle compensation apparatus for the display panel.

An embodiment of the present disclosure provides a computer-readable storage medium, wherein the computer-readable storage medium stores a computer program, and the computer program, when being executed by a processor, implements the above-mentioned viewing angle compensation method for the display panel.

An embodiment of the present disclosure provides an electronic device, including an electronic device, including a memory, a processor and a computer program stored in the memory and capable of running on the processor, and the processor, when executing the computer program, implements the above-mentioned viewing angle compensation method for the display panel.

It should be understood by the skilled in the art that the embodiments of the present application may provide a method, system or computer program product. Therefore, forms of a complete hardware embodiment, a complete software embodiment or a software and hardware aspect combined embodiment may be adopted in the present application. Moreover, a form of a computer program product executed on one or more computer available storage media (including, but not limited to a magnetic disk memory, a CD-ROM, and an optical memory) including computer available program codes may be adopted in the present application.

The above descriptions are merely embodiments of the present application, but are not intended to limit the present application. Any modifications and variations may be made on the present application by the skilled in the art. Any modifications, equivalent interpositions, improvements, etc. made within the spirit and principle of the present application shall fall within the scope of claims of the present application.

What is claimed is:

1. A viewing angle compensation method for a display panel, comprising:

receiving to-be-processed image data, the image data comprising pixel points formed in a plurality of rows and a plurality of columns, and each pixel point having different subpixels on red, green and blue three-color channels;

adjusting current gray-scale values of the subpixels of the pixel point by looking up a preset visual compensation lookup table to obtain adjusted gray-scale values, comprising: performing division in a way of dividing two adjacent pixel points into a group in the plurality of pixel points comprised in the image data to obtain a plurality of groups of pixel points, each group of pixel points comprising a first pixel point and a second pixel point; dividing the red, green and blue three-color channels into two groups to obtain a first group of color channels and a second group of color channels, the first group of color channels comprising two color channels, and the second group of color channels comprising one color channel; adjusting the gray-scale values of the subpixels of the first pixel point according to the first group of color channels and a first gamma curve in the preset visual compensation lookup table, the first gamma curve showing the adjustable maximum gray-scale values of the gray scales of the subpixels; and adjusting the gray-scale values of the subpixels of the second pixel point according to the second group of color channels and a second gamma curve in the preset visual compensation lookup table, the second gamma curve showing the adjustable minimum gray-scale values of the gray scales of the subpixels;

wherein in the way of dividing two adjacent pixel points into a group comprises: for each row of pixel points, two adjacent pixel points are divided into a group; for each column of pixel points, two adjacent pixel points are divided into a group; and outputting first target image data as visually-compensated image data according to the adjusted gray-scale values corresponding to the subpixels.

2. The method of claim 1, wherein the step of adjusting the gray-scale values of the subpixels of the first pixel point according to the first group of color channels and a first gamma curve comprises:

acquiring a first color channel and a second color channel from the first group of color channels;

acquiring the current gray-scale values of subpixel points of the first pixel point; and querying the first gamma curve on the first color channel and the second color channel according to the current gray-scale values of the subpixel points to obtain the adjusted gray-scale values.

3. The method of claim 1, wherein the step of adjusting the gray-scale values of the subpixels of the second pixel point according to the second group of color channels and a second gamma curve comprises:

acquiring a third color channel from the second group of color channels;

acquiring the current gray-scale values of subpixel points of the second pixel point; and querying the second gamma curve on the third color channel according to the current gray-scale values of the subpixel points to obtain the adjusted gray-scale values.

4. The method of claim 1, wherein before the visually-compensated image data is determined, the method further comprises:

determining a high-frequency area comprised in the first target image data by performing high-frequency detection on the first target image data;

acquiring a compensation gain intensity weight corresponding to the high-frequency area by looking up a preset visual compensation gain weight lookup table, the preset visual compensation gain weight lookup table comprising an inverse relationship between an area intensity value and the compensation gain intensity weight; and adjusting a viewing angle compensation gain value of the high-frequency area according to the compensation gain intensity weight, and outputting second target image data as the visually-compensated target image data.

5. The method of claim 1, wherein before the visually-compensated image data is determined, the method further comprises:

determining a flicker intensity value corresponding to the pixel point by performing flicker point detection on the first target image data;

acquiring a gain adjustment value corresponding to the flicker intensity value by looking up a preset flicker intensity gain adjustment table;

performing increment adjustment on the flicker intensity value according to the gain adjustment value to obtain a high-frequency intensity value corresponding to the pixel point;

acquiring a compensation gain intensity weight corresponding to the high-frequency intensity value by looking up the preset visual compensation gain weight lookup table; and adjusting a viewing angle compensation gain value of the high-frequency intensity value according to the compensation gain intensity weight, and outputting third target image data as the visually-compensated target image data.

6. The method of claim 5, wherein the step of determining a flicker intensity value corresponding to the pixel point by performing flicker point detection on the first target image data comprises:

selecting any one of the pixel points as a target pixel point from the plurality of pixel points comprised in the first target image data;

calculating a mean value of the target pixel point in neighbourhoods by utilizing a preset intensity detection template; and calculating a flicker intensity value corresponding to the target pixel point according to the mean value.

7. A viewing angle compensation apparatus for a display panel, comprising:

a receiving unit configured to receive to-be-processed image data, the image data comprising pixel points formed in a plurality of rows and a plurality of columns, and each pixel point having different subpixels on red, green and blue three-color channels;

a first adjustment unit configured to adjust current gray-scale values of the subpixels of the pixel point by looking up a preset visual compensation lookup table to obtain adjusted gray-scale values;

an output unit configured to output first target image data according to the adjusted gray-scale values corresponding to the subpixels; and a determination unit configured to take the first target image data as visually-compensated image data, wherein, the first adjustment unit comprises: a division module and an adjustment module;

the division module configured to perform division in the plurality of pixel points comprised in the image data in a way of dividing two adjacent pixel points into a group to obtain a plurality of groups of pixel points, each group of pixel points comprising a first pixel point and a second pixel point; wherein the performing division in a way of dividing two adjacent pixel points into a group, comprises: for each row of pixel points, two adjacent pixel points are grouped into a group; or, with regard to each column of pixel points, two adjacent pixel points are grouped into a group;

the division module being further configured to divide the red, green and blue three-color channels into two groups to obtain a first group of color channels and a second group of color channels, the first group of color channels comprising two color channels, and the second group of color channels comprising one color channel;

the adjustment module configured to adjust the gray-scale values of the subpixels of the first pixel point according to the first group of color channels and a first gamma curve in the preset visual compensation lookup table, the first gamma curve showing the adjustable maximum gray-scale values of the gray scales of the subpixels;

the adjustment module being further configured to adjust the gray-scale values of the subpixels of the second pixel point according to the second group of color channels and a second gamma curve in the preset visual compensation lookup table, the second gamma curve showing the adjustable minimum gray-scale values of the gray scales of the subpixels.

8. The apparatus of claim 7, wherein the adjustment module comprises:

a first acquisition submodule configured to acquire a first color channel and a second color channel from the first group of color channels;

the first acquisition submodule being further configured to acquire the current gray-scale values of subpixel points of the first pixel point; and a first query submodule configured to query the first gamma curve on the first color channel and the second color channel according to the current gray-scale values of the subpixel points to obtain the adjusted gray-scale values.

9. The apparatus of claim 7, wherein the adjustment module comprises:

a second acquisition submodule configured to acquire a third color channel from the second group of color channels;

the second acquisition submodule being further configured to acquire the current gray-scale values of subpixel points of the second pixel point; and a second query submodule configured to query the second gamma curve on the third color channel according to the current gray-scale values of the subpixel points to obtain the adjusted gray-scale values.

10. The apparatus of claim 7, wherein the apparatus further comprises:

a first detection unit configured to determine a high-frequency area comprised in the first target image data by performing high-frequency detection on the first target image data;

a first acquisition unit configured to acquire a compensation gain intensity weight corresponding to the high-frequency area by looking up a preset visual compensation gain weight lookup table, the preset visual compensation gain weight lookup table comprising an inverse relationship between an area intensity value and the compensation gain intensity weight; and a second adjustment unit further configured to adjust a viewing angle compensation gain value of the high-frequency area according to the compensation gain intensity weight, and output second target image data as the visually-compensated target image data.

11. The apparatus of claim 7, wherein the apparatus further comprises:

a second detection unit configured to determine a flicker intensity value corresponding to the pixel point by performing flicker point detection on the first target image data;

a second acquisition unit configured to acquire a gain adjustment value corresponding to the flicker intensity value by looking up a preset flicker intensity gain adjustment table;

a third adjustment unit configured to perform increment adjustment on the flicker intensity value according to the gain adjustment value to obtain a high-frequency intensity value corresponding to the pixel point;

the second acquisition unit being further configured to acquire a compensation gain intensity weight corresponding to the high-frequency intensity value by looking up the preset visual compensation gain weight lookup table; and the third adjustment unit being further configured to adjust a viewing angle compensation gain value of the high-frequency intensity value according to the compensation gain intensity weight, and output third target image data as the visually-compensated target image data.

12. The apparatus of claim 11, wherein the second detection unit comprises:

a selection module configured to select any one of the pixel points as a target pixel point from the plurality of pixel points comprised in the first target image data;

a calculation module configured to calculate a mean value of the target pixel point in neighbourhoods by utilizing a preset intensity detection template; and the calculation module being further configured to calculate a flicker intensity value corresponding to the target pixel point according to the mean value.

13. A display panel, comprising the viewing angle compensation apparatus for the display panel of claim 7.

14. A non-transient computer-readable recording medium, storing a computer program, the computer program, when being executed by a processor, implementing the viewing angle compensation method for the display panel of claim 1.

15. An electronic device, comprising a memory, a processor and a computer program stored in the memory and capable of running on the processor, and the processor, when executing the computer program, implementing the viewing angle compensation method for the display panel of claim 1.

* * * * *